United States Patent
Renner et al.

(10) Patent No.: US 9,919,827 B2
(45) Date of Patent: Mar. 20, 2018

(54) THERMOPLASTIC BOTTLE WITH VALVE CUP RETAINING PROTRUSIONS AND METHOD OF CRIMPING A VALVE CUP ON A THERMOPLASTIC BOTTLE

(71) Applicant: S.C. Johnson & Son, Inc., Racine, WI (US)

(72) Inventors: Thomas A. Renner, Racine, WI (US); Joseph G. Stichart, Oak Creek, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 14/373,641

(22) PCT Filed: Jan. 25, 2013

(86) PCT No.: PCT/US2013/023264
§ 371 (c)(1),
(2) Date: Jul. 22, 2014

(87) PCT Pub. No.: WO2013/112913
PCT Pub. Date: Aug. 1, 2013

(65) Prior Publication Data
US 2015/0034584 A1 Feb. 5, 2015

(30) Foreign Application Priority Data
Jan. 27, 2012 (CH) .................................. 121/2012

(51) Int. Cl.
*B65D 1/02* (2006.01)
*B65D 83/20* (2006.01)
(Continued)

(52) U.S. Cl.
CPC ............ *B65D 1/0246* (2013.01); *B29C 49/08* (2013.01); *B65B 3/022* (2013.01); *B65B 7/285* (2013.01);
(Continued)

(58) Field of Classification Search
CPC .. B65D 83/205; B65D 83/207; B65D 1/0246; B65B 7/285
(Continued)

(56) References Cited

U.S. PATENT DOCUMENTS 1,796,729 A * 3/1931 Niver et al. .................. 215/230
3,774,795 A * 11/1973 Leenaards ..................... 215/328
(Continued)

FOREIGN PATENT DOCUMENTS

WO     WO 91/10606 A1    7/1991
WO     WO 2011/090457 A1    7/2011

OTHER PUBLICATIONS

International Search Report PCT/US2013/023264 dated Apr. 24, 2013.
(Continued)

*Primary Examiner* — Jeffrey Allen
*Assistant Examiner* — Jennifer Castriotta

(57) ABSTRACT

A thermoplastic bottle has a crimped valve cup and a method of manufacturing a thermoplastic bottle includes crimping a valve cup to such a bottle. The thermoplastic bottle and valve cup may be used in a system to dispense aerosol products. At least one protrusion extends from a flange of the bottle to which the valve cup is crimped. Prior to being crimped to the bottle, the valve cup is set to the bottle with an interference fit between a crimping portion of the valve cup and the protrusion. The interference fit prevents shifting of the valve cup from its set position on the bottle prior before the valve cup is crimped.

19 Claims, 6 Drawing Sheets

(51) Int. Cl.
*B65B 7/28* (2006.01)
*B65B 3/02* (2006.01)
*B65D 83/38* (2006.01)
*B29C 49/08* (2006.01)
*B29L 31/00* (2006.01)

(52) U.S. Cl.
CPC ......... *B65D 1/0276* (2013.01); *B65D 83/205* (2013.01); *B65D 83/207* (2013.01); *B65D 83/38* (2013.01); *B29B 2911/1442* (2013.01); *B29B 2911/14433* (2013.01); *B29L 2031/7158* (2013.01)

(58) Field of Classification Search
USPC .......................................... 220/915; 215/324
See application file for complete search history.

(56) References Cited

U.S. PATENT DOCUMENTS

| | | | |
|---|---|---|---|
| 4,730,752 A | | 3/1988 | Kimball et al. |
| 5,035,106 A | * | 7/1991 | Haase .................... B65B 7/285 29/511 |
| 5,199,615 A | * | 4/1993 | Downing et al. ............. 222/397 |
| 5,503,303 A | | 4/1996 | LaWare et al. |
| 5,806,700 A | * | 9/1998 | Henning ........................ 215/328 |
| 6,253,970 B1 | * | 7/2001 | Kohn et al. .................... 222/397 |
| 6,817,493 B1 | | 11/2004 | Parsons et al. |
| 6,820,823 B2 | | 11/2004 | Parsons et al. |
| 7,028,866 B2 | | 4/2006 | Kunesh et al. |
| 7,303,087 B2 | | 12/2007 | Flashinski et al. |
| D587,576 S | | 3/2009 | Miller et al. |
| 2009/0014679 A1 | | 1/2009 | Hygema et al. |
| 2009/0020621 A1 | | 1/2009 | Clark et al. |

OTHER PUBLICATIONS

International Preliminary Report on Patentability and Written Opinion of the International Searching Authority PCT/US2013/023264 dated Jul. 29, 2014.

* cited by examiner

THERMOPLASTIC BOTTLE WITH VALVE CUP RETAINING PROTRUSIONS AND METHOD OF CRIMPING A VALVE CUP ON A THERMOPLASTIC BOTTLE

This application is a U.S. national phase application of copending International Patent Application No. PCT/EPUS2013/23264, filed on Jan. 25, 2013, which claims priority from Swiss Patent Application No. 121/2012, filed on Jan. 27, 2012.

BACKGROUND

Field of the Invention

Our invention generally relates to a thermoplastic bottle onto which a structure is crimped, and a method of manufacturing a thermoplastic bottle that includes crimping a structure to the bottle. More specifically, our invention relates to a thermoplastic bottle that includes protrusions extending from a flange adjacent to one end of the bottle, with the protrusions providing for an interference fit with a valve cup prior to the valve cup being crimped to the flange.

Related Art

Systems that are used to dispense liquid and/or gaseous products from a container such as a bottle, and in particular, in systems that are used to dispense aerosol products, a valve mechanism is used to allow selected release of the product from the bottle. The valve mechanism is usually a separately manufactured structure that is attached to the bottle after the bottle structure itself is manufactured. Often, the valve structure includes a valve cup as the portion that is physically attached to the bottle, with the valve cup positioned adjacent to an open end of the bottle. An example of such a valve cup can be seen in U.S. Pat. No. 4,730,752, which is hereby incorporated by reference in its entirety.

To attach a valve cup to a bottle, the valve cup can be crimped to a portion of the bottle such as an annular ring that is provided adjacent to an open end of the bottle. The aforementioned U.S. Pat. No. 4,730,752 demonstrates crimping of a valve cup to a bottle. The crimping attachment of a valve cup is usually performed in a two-step process. First, the valve cup is set onto the bottle at one location, in a manufacturing line. The bottle and set valve cup are then moved to a crimping station at another location in the manufacturing line, where the valve cup is crimped to the bottle structure.

Because the setting of the valve cup onto the bottle and the crimping of the valve cup to the bottle ore separate steps, and because the bottle with the set, but not crimped, valve cup is often moved before the crimping operation, a problem sometimes arises in that the valve cup may shift from is initially-set position before the crimping operation occurs, in general the tolerance in the positioning of the valve cup that allows for a successful crimping operation is very small, sometimes on the order of thousandths of an inch. Thus, even a small shift in the valve cup can greatly reduce the effectiveness of the crimped connection between the valve cup and bottle. For aerosol products, when the bottle with an ineffectively crimped valve cup is pressurized, the valve cup can sometimes be completely blown off of the bottle. In less extreme examples, poorly crimped valve cups may allow product to leak from, the bottle.

To stabilize a set, but not crimped, valve cup to a bottle, dimples are sometimes added to the portion of the valve cup that contacts the bottle. The dimples can effectively hold the valve cup in place before the crimping operation, particularly when the bottle is made from a metallic material. Further, the dimples do not damage the relatively-strong metallic bottle structure when the valve cup is crimped.

There is an increasing interest, however, in the use of thermoplastic bottles that dispense aerosol products. As compared to metallic bottles, thermoplastic bottles provide greater flexibly in terms of manufacturing and aesthetic design, recyclability, and thermoplastic bottles are potentially less expensive than metallic bottles. When a valve cup that includes dimples in its crimping portion is crimped to a thermoplastic bottle, the dimples create high stress on the portions of the plastic bottle structure that are contacted by the dimples after crimping. The stress created by the dimples can sometimes crack the thermoplastic bottle structure, rendering the thermoplastic bottle useless for dispensing pressurized products, such as aerosol compositions.

SUMMARY OF THE INVENTION

One aspect of our invention provides a bottle. The bottle includes a main body with an open end and a closed end. A flange is positioned adjacent to the open end, with the flange being configured to contact and to retain a structure that is crimped to the flange in such a manner so as to close the open end of the bottle. At least one protrusion extends from the flange in a direction away from the rest of the bottle. The main body, the annular flange, and the at least one protrusion are formed from a thermoplastic material.

Another aspect of our invention provides a method of providing a system dispensing an aerosol composition. The method includes setting a structure adjacent to a flange at one end of the bottle, with an interference fit being provided between the structure and the bottle. The valve cup is crimped to the flange of the bottle, and an aerosol composition is provided in the bottle. The bottle is made from a thermoplastic material.

According to another aspect of our invention provides a method of crimping a structure on a bottle. The method includes providing a bottle formed from a thermoplastic material. A structure is set adjacent to an opening of the bottle at a first location, with the structure being set to the bottle with an interference fit. The bottle and the set structure are moved from the first location to a second location, and the structure is crimped to the bottle at the second location.

DETAILED DESCRIPTION OF THE INVENTION

Figure 1:
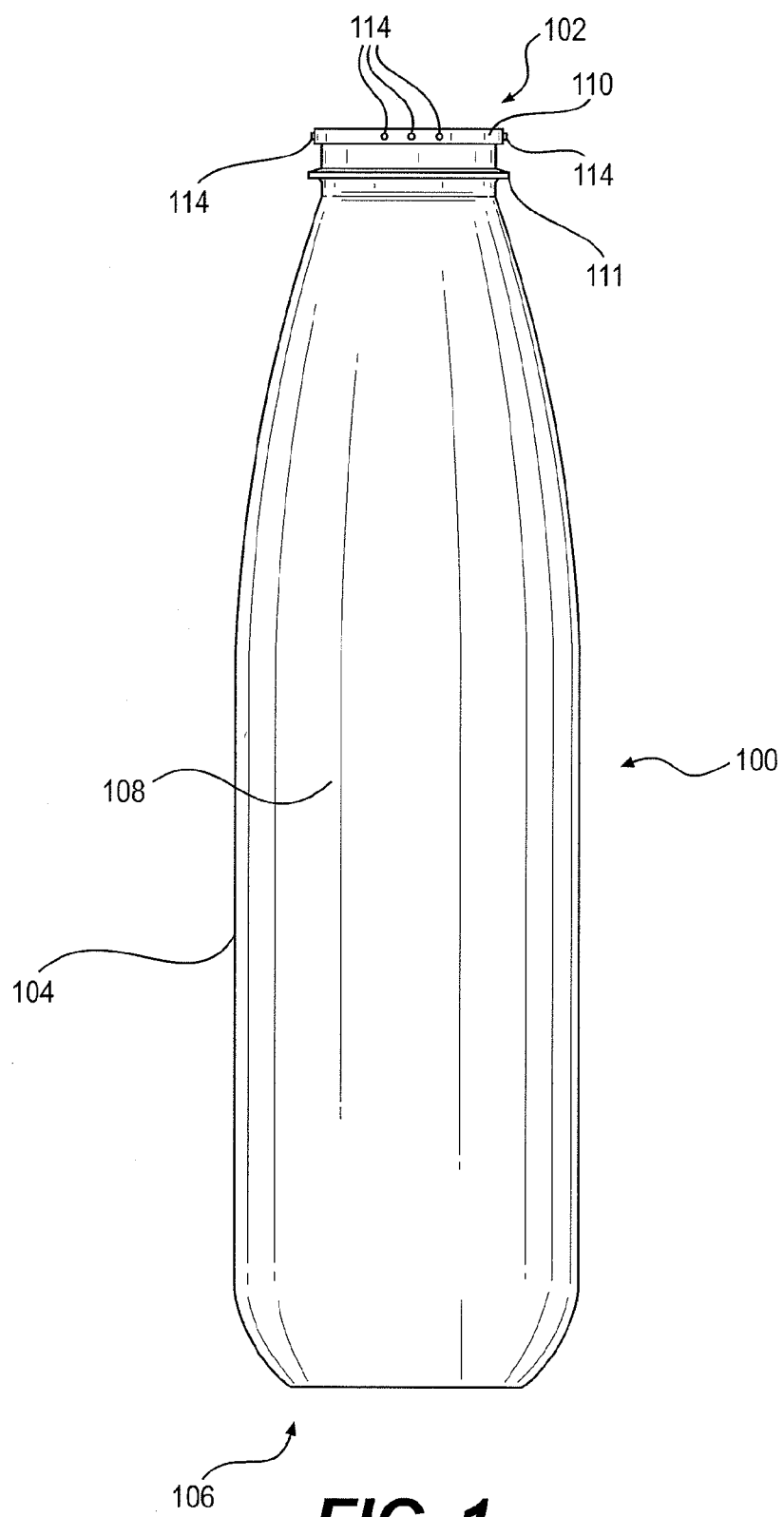
FIG. 1 is a side view of a bottle according to the invention.

Our invention relates to crimping a structure to a thermoplastic bottle. In specific embodiments, our invention relates to crimping the valve cup portion of a valve structure to a thermoplastic bottle as part of a process of creating a system to dispense a liquid and/or a gaseous product. Specific products that could be dispensed using the system include aerosol spray compositions, such as air fresheners, carpet cleaners, insect repellants, deodorants, hair sprays, cleaning preparations, and shaving preparations, including foams and gels. Other examples of products that can be dispensed using the system include fabric fresheners, refreshers, deodorizers, sanitizers, disinfectants, soaps, insecticides, fertilizers, herbicides, fungicides, algaecides, pesticides, rodenticides, paints, body sprays, topical sprays, polishes, and shoe or footwear spray products. The system, however, is not limited to dispensing any particular type of spray, nor is the system limited to dispensing any particular type of product.

A gas propellant is used to dispense aerosol and other products. In general, there are two main types of propellants used in aerosol systems; (1) liquefied gas propellants and (2) compressed gas propellants, such as carbon dioxide and nitrogen. Either of these types of propellant can be used with the system described herein. The particular type of liquefied gas or compressed gas that is used as the propellant in the system can be selected based on convenience, cost, properties of the corresponding container, properties of the liquid product formulation, etc. Examples of known liquefied gas propellants that can be used with the system include hydrocarbons and hydrofluorocarbons (HFC). Examples of known compressed gases that can be used in a system according to the invention include air, argon, nitrogen, nitrous oxide, inert gases, and carbon dioxide.

Along with the particular type of gas propellant, the amount of headspace provided by the gas can be adjusted or tailored as desired. When using a compressed gas propellant, the compressed gas does not significantly dissolve in the liquid portion of the product, but rather the amount of headspace is primarily a function of the amount of compressed gas used in the container. In example embodiments of systems according to the invention, a headspace of 30 to 40% is used. However, in alternative embodiments the headspace could be lower than 30% or higher than 40%.

Along these lines, one of ordinary skill in the art will appreciate that properties of such compressed gas products, including viscosity, density, and surface tension, can easily be adjusted to achieve desired effects. In example embodiments, the density of the compressed gas product is about 1.00 g/cm$^3$, the surface tension is about 30 mN/m, and the viscosity is about 1.0-1.6 cP.

A liquid component used in the inventive system will include the type of composition to be dispensed, e.g., an air freshening composition. In some embodiments, the liquid component will include at least 90% water, and less than 10% low molecular weight alcohols. In a more specific embodiment, the composition includes less than 4% low molecular weight alcohols. The liquid component could also include additional compositions, such as surfactants and/or solvents to facilitate the dissolving of liquid component with another liquid component.

FIG. 1 shows a plastic dispensing bottle 100 according to an embodiment of the invention. The plastic bottle 100 includes an open end 102, a main body portion 104, and closed end 106. The product to be dispensed is contained in the interior 108 of the bottle 100. It should be noted that a bottle according to the invention is not limited to the particular shape or configuration that is shown in FIG. 1. For example, the main body portion 104 of the bottle 100 could be more or less cylindrically shaped than is depicted. Alternatively, the main-body portion 104 could have multiple sides so as to have be a multi-sided polygon in cross section. Further, although not shown, the surface of the main body 104 could be formed with desired features, such as indents, ridges, etc. Even further, the open and closed ends 102 and 106 could be formed in any desired shape.

The bottle 100 is made from a thermoplastic material. Examples of thermoplastic materials that could be used to form bottle 100 include ethylene based polymers, such as ethylene/vinyl acetate, ethylene acrylate, ethylene methacrylate, ethylene methyl acrylate, ethylene methyl methacrylate, ethylene vinyl acetate carbon monoxide, and ethylene N-butyl acrylate carbon monoxide, polybutene-1, high and low density polyethylene, polyethylene blends and chemically modified polyethylene, copolymers of ethylene and C1-C6 mono or di-unsaturated monomers, polyamides, polybutadiene rubber, polyesters such as polyethylene terephthalate, polyethylene naphthalate, polybutylene terephthalate; thermoplastic polycarbonates, atactic polyalphaolefins, including atactic polypropylene, polyvinylmethylether and others; thermoplastic polyacrylamides, polyacrylonitrile, copolymers of acrylonitrile and other monomers such as butadiene styrene; polymethyl pentene, polyphenylene sulfide, aromatic polyurethanes; styrene-acrylonitrile, acrylonitrile-butadiene-styrene, styrene-butadiene rubbers, acrylonitrile-butadiene-styrene elastomers, polyphenylene sulfide, A-B, A-B-A, A-(B-A)$_n$-B, (A-B)$_n$-Y block polymers, wherein the A block comprises a polyvinyl aromatic block such as polystyrene, the B block comprises a rubbery midblock which can be polyisoprene, and optionally hydrogenated, such as polybutadiene, Y comprises a multivalent compound, and n is an integer of at least three, and mixtures of these substances. In particular embodiments, the thermoplastic material is polyethylene terephthalate (PET). PET is a readily available thermoplastic that is sold by marry different manufactures. Along these lines, the thermoplastic polymer used to make the plastic bottle 100 may be transparent, opaque, or partially opaque.

The plastic bottle 100 can be formed by a variety of techniques that are known in the art. As one example, the plastic bottle 100 may be formed using an injection molding process in combination with a blow molding process. In this example, a pre-form of the plastic bottle 100 is first made using injection molding techniques. The pre-form provides the mass of material that is eventually stretched into the final shape of the bottle 100. The pre-form may also include portions of the bottle in a substantially final form. For example, in bottle 100 an annular flange 110 and an annular rim 111 in a neck portion of the bottle 100 may be present in the pre-form and not changed thereafter. Note, that the annular rim 111 may be provided to the bottle 100 in order to facilitate handling of the bottle during the forming processes. The pre-form of the bottle is subsequently blow molded to stretch portions of the thermoplastic material into the final bottle shape. The blow molding process includes heating the pre-form, enclosing the pre-form within a blow mold structure, and expanding the heated perform into the shape of the mold using air pressure. Using the combination of an injection and blow molding processes, the plastic bottle 100 can be formed integrally, with a one-piece construction.

Those skilled in the art will recognize the numerous alternative techniques that can be used to produce a thermoplastic bottle according to the invention, including different injection and blow molding techniques from those described above. Similarly, those skilled in the art will recognize that a thermoplastic bottle, as described herein, need not be formed as an integral structure, but can be formed by processes wherein portions of the bottle are separately manufactured, with rite separate portions connected together so as to form the final bottle structure.

The plastic bottle 100 can be used to contain and to dispense pressurized products, such as gas and liquid mixtures that form aerosol sprays. In this regard, the plastic bottle 100 may be made in accordance with applicable regulations for making pressurized dispensing products, such as the U.S. Department of Transportation (DOT) regulations and the U.S. Interstate Commerce Commission (ICC) regulations. Such regulations mandate certain dimensional, material, manufacture, wall thickness, and testing requirements for a container to be charged to a given pressure.

Figure 2A:
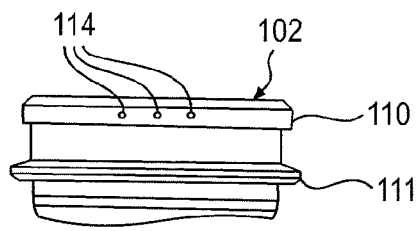
FIG. 2A is a side view of the open-end of the bottle shown in FIG. 1.
Figure 2B:
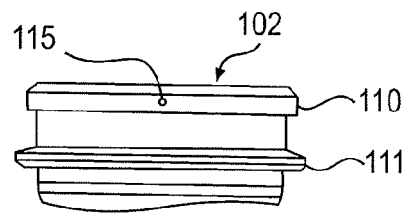
FIG. 2B is another side view of the open-end of the bottle shown in FIG. 1.
Figure 2C:
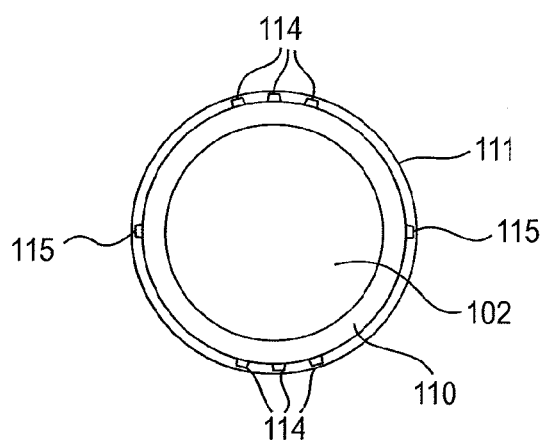
FIG. 2C is a top view of the open-end of the bottle shown in FIG. 1.

FIGS. 2A-2C are detailed views of the open-end of the bottle 100. The annular flange 110 is provided adjacent to the open-end 102 of the bottle 100. A structure, such as a valve cup, can be crimped to the annular flange 110, as will be described in detail below. The annular flange 110 includes a plurality of protrusions 114 that extend outward from the surface of the annular flange 110. The protrusions 114 provide for an interference lit with the structure to be crimped during a period of time when the structure is set to the bottle 100, but not yet crimped to the annular flange 110, as will be described in detail below.

It should be noted that although the flange 110 depicted in FIGS. 2A-2C is annular, i.e., substantially ring-shaped, in other embodiments, the flange 110 may have a different shape and positioning. For example, the flange 110 could have multiple sides in some embodiments, and the flange 110 could be set back from the top end of the bottle 100 towards the annular rim 111. In this regard, those skilled in the art will recognize that the flange 110 can be configured in a manner that matches the shape of portion of the bottle from which the flange extends. Additionally, or alternatively, the flange 110 can be configured in a manner that allows for an easy formation of the flange 110 in the bottle manufacturing process, e.g., the flange 110 can be configured to allow for its molding in combination with the rest of the bottle 100.

In some embodiments, the protrusions 114 are integrally provided with the annular flange. For example, the protrusions 114 may be integrally molded in the two-stage blow molding process described above. In alternative embodiments, the protrusions may be separately provided to the flange 110, for example, by a printing-type operation.

The protrusions 114 can vary in size, shape, and positioning on the flange 110. With respect to shape, the protrusions 114 may be, for example, round, square, rectangular, hexagonal, triangular, diamond-shaped, oval, pyramidal, or any other shape. With respect to sizing, in some embodiments, the protrusions 114 extend from about 0.02 mm to about 2 mm from the annular flange 110, in more specific embodiments, the protrusions 114 extend from about 0.02 mm to about 0.5 mm from the annular flange 110, and in even more specific embodiments tire protrusions 114 extend from about 0.02 mm to about 0.3 mm from the annular flange 110. In a particular embodiment, the protrusions 114 extend about 0.1 mm from the flange 110. In general, the larger the protrusions 114, the more cross-sectional area provided by each of the protrusions 114, and greater the number of protrusions 114 that extend, from the flange 110, the tighter the interference fit that will be created with a structure set to the flange 110, as will be described in more detail below. The protrusions 114 may also be configured to aid in centering the structure set to the flange for crimping. Notably, there is no requirement that the protrusions 114 on the bottle 100 all have the same size, shape, or extend the same distance from the flange 110 of the bottle 100.

As generally indicated in FIGS. 1 and 2A-2C, the protrusions 114 extend in a direction that is substantially orthogonal to an axis of the bottle that runs from the open end 102 to the closed end 106. In other embodiments, the protrusions 114 may be set at non-perpendicular angles relative to the axis of the bottle. As with the size, shape, and positioning of the protrusions 114, the angle the protrusions 114 are set may be varied so as to adjust the interference fit created with the protrusions, as will be described below.

Figure 3:
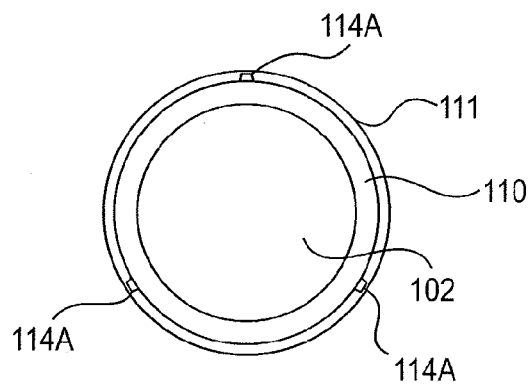
FIG. 3 is a top view of the open-end of a bottle according to an alternative embodiment of the invention.

In the embodiment of the bottle 100 that is depicted in FIGS. 2A-2C, patterns of three protrusions 114 are provided on opposite sides of the flange 110. Further, single protrusions 115 are provided at positions on opposite sides of the flange 110. The depicted 3/1/3/1 pattern of protrusions 114, however, is merely an example of a pattern that can be used in embodiments of the invention. In other embodiments, different patterns of protrusions may be used. FIG. 3 demonstrates such an alternative pattern of protrusions 114A. In this embodiment, the protrusions 114a are set about one hundred twenty degrees apart on the annular flange 110. Notably, in the embodiments depicted in FIGS. 2A-2C and 3, the protrusions 114, 114A, and 115 are positioned symmetrically about the annular flange 110. It is not required, however, that the protrusions 114, 114A, and 115 be symmetrically arranged, and in other embodiments, protrusions are provided asymmetrically about the flange of the bottle. It will further be appreciated from the foregoing and the following descriptions, that in some embodiments, only a single protrusion may be provided on the annular flange. That is, a single protrusion may be configured with a size and shape to provide the desired interference fit between the uncrimped valve cup and the bottle described below.

Figure 4:
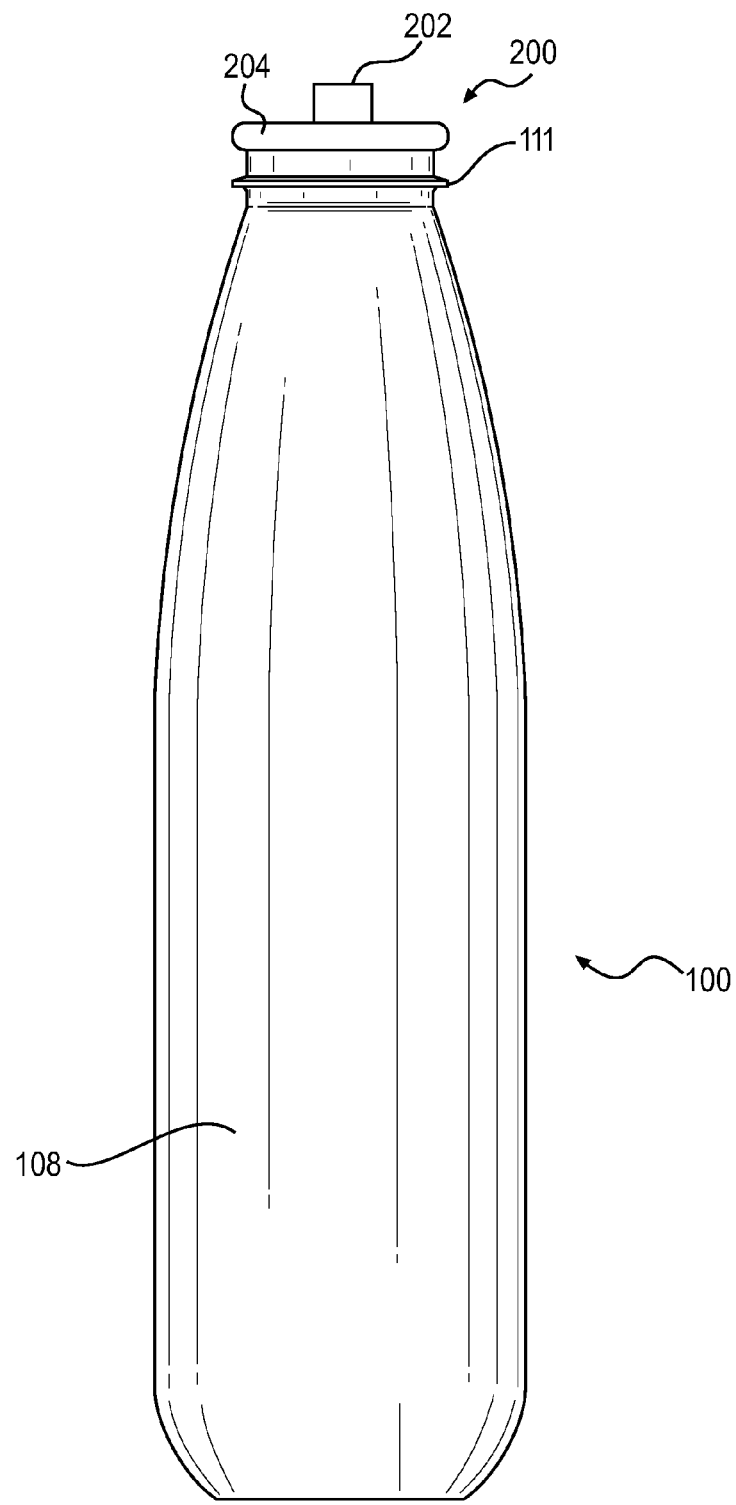
FIG. 4 is a side view of a bottle according to the invention with a valve structure crimped to the open end.

FIG. 4 depicts the bottle 100 with a valve structure 200 closing the open-end of the bottle 100. The valve structure 200 includes a valve stem 202 through which the product contained in the interior 108 of bottle 100 is dispensed. The valve structure 200 also includes a valve cup 204 that is crimped to the annular flange 110 of the bottle 100, as will be described in more detail below. The valve cup 204, in effect, provides a lid for closing the open-end 102 of the bottle 100. In this regard, although a "valve cup" is described and depicted herein as being a structure that is crimped to the open end of the bottle, the structure that is crimped to the bottle may alternatively be any number of other forms, such as a lid, cap, top, etc. And, in many embodiments, the crimped structure will be formed to substantially close the open-end of the bottle. The only requirement for the structure that is crimped to the bottle is drat the structure has a crimping portion that can be contacted to the bottle in the same manner as the crimping portion of the valve cup described below.

Figure 5:
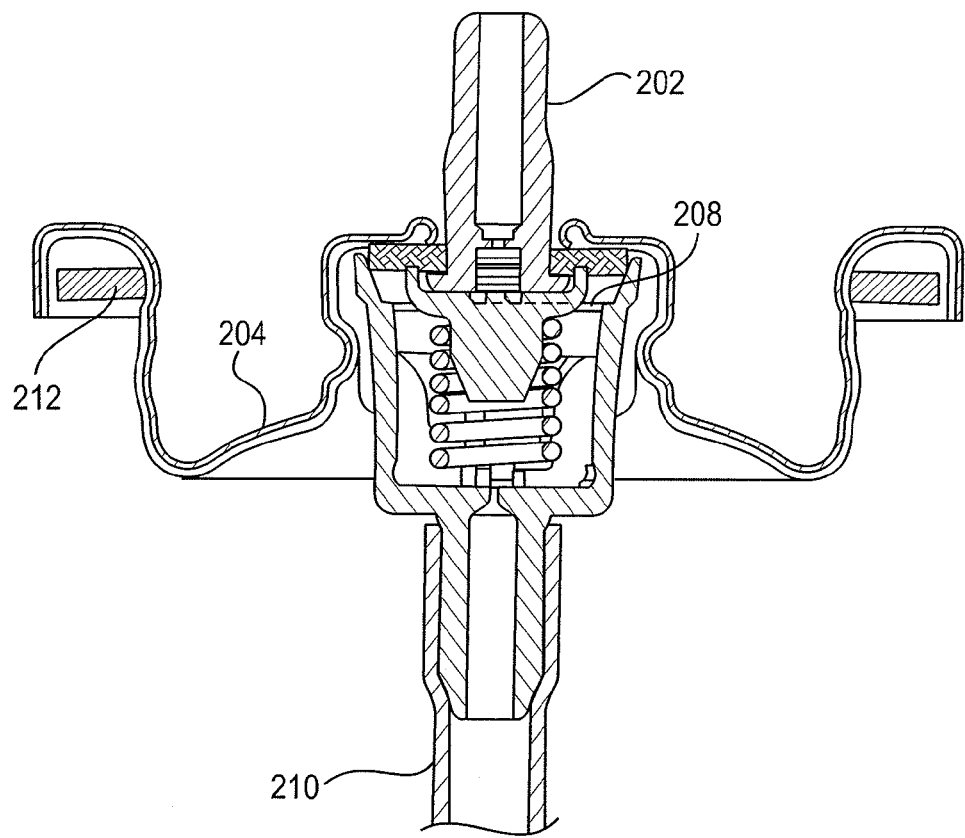
FIG. 5 is a cross-sectional view of a valve structure.

Further details of the valve structure 200 can be seen in FIG. 5, including a valve seat 208, a dip tube 210, and a valve cup gasket 212. Note that the valve cup 204 is a separate structure from other components of the valve structure 200. As such, the valve cup 204 may be set and crimped to the bottle 100 prior to the other components of the valve structure 200 being assembled with the bottle 100.

Although a specific valve structure 200 is depicted, those skilled in the art will recognize that there is a wide variety of alternative valve structures that can be used in connection with the invention described herein. Examples of such valve structures can be found, for example, in U.S. Pat. No. 5,503,303; U.S. Pat. No. 6,817,493; U.S. Pat. No. 6,820,823; U.S. Pat. No. 7,028,866; U.S. Pat. No. 7,303,087; and U.S. Design Patent No. 587,576, and U.S. Patent Application Pub. No. 2009/0020621, all of which are incorporated by reference in their entirety, it should be noted that the components of the valve structure 200 can be made from a variety of materials, including, for example, the thermoplastics that are described above as being capable of being used to form the bottle 100. As an alternative, some or ail of the components of the valve structure 200 can be made of metallic materials, such as steel, tin-free steel, aluminum, etc.

Figure 6A:
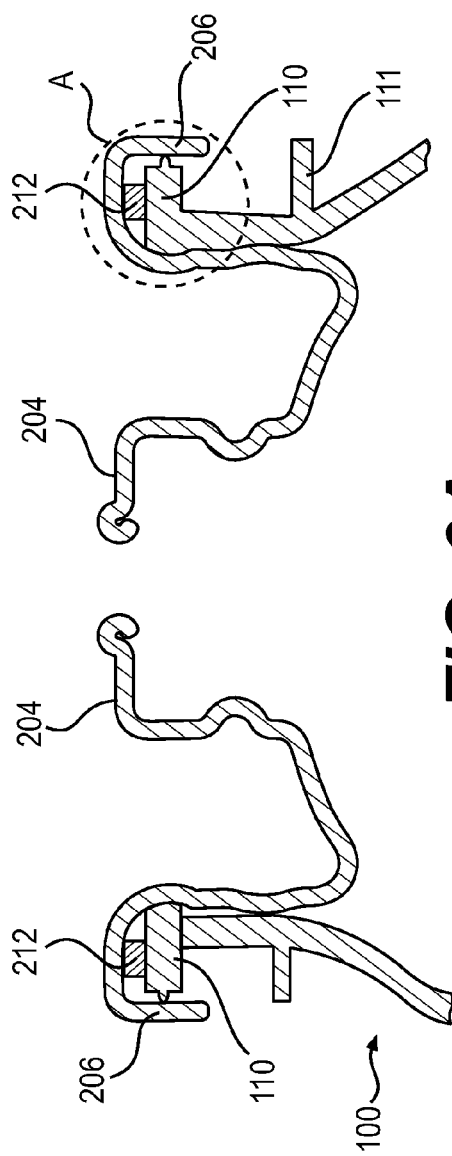
FIG. 6A is a cross-sectional view of a bottle and a valve cup according to the invention prior to the valve cup being crimped to the bottle.
Figure 6B:
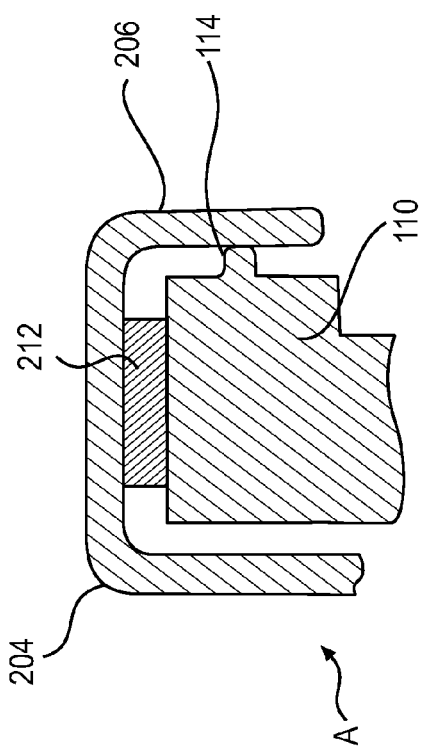
FIG. 6B is a view of the Section A shown in FIG. 6A.
Figure 7:
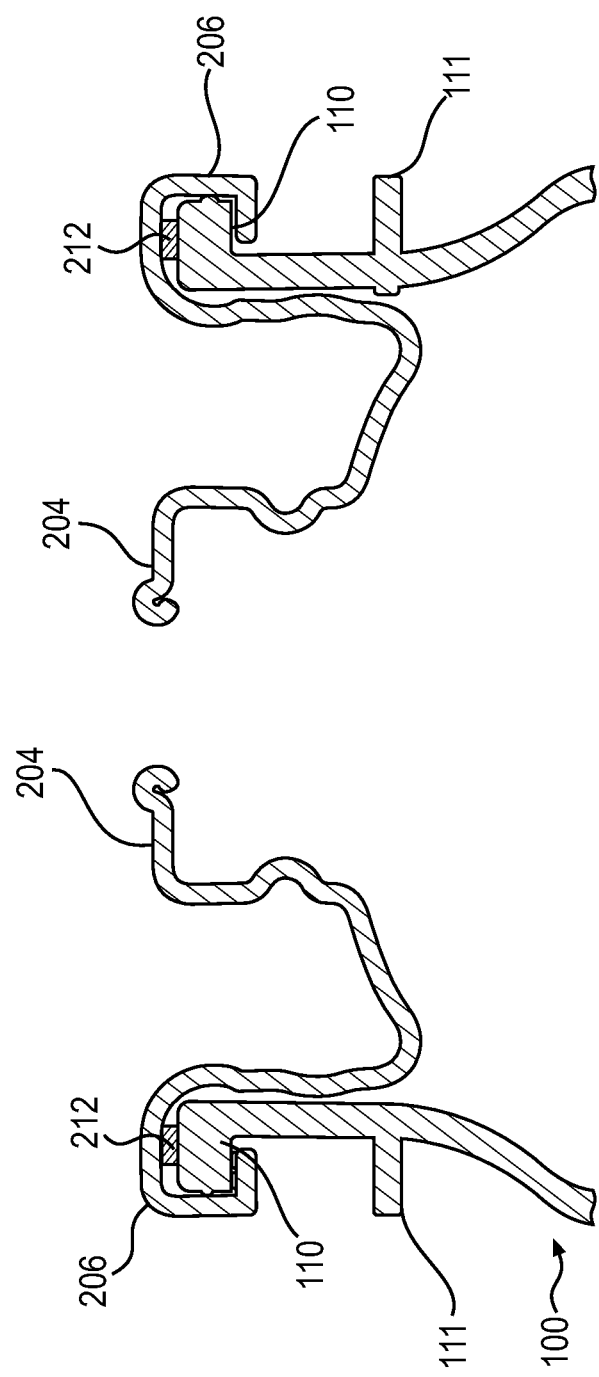
FIG. 7 is a cross-sectional view of the bottle and the valve cup shown in FIG. 6A after the valve cup is crimped to the bottle.

FIGS. 6A and 6B depict the valve cup 204 set adjacent to the annular flange 110 prior to a crimping operation, and FIG. 7 depicts the valve cup 204 after being crimped to the annular flange 110. As shown in FIG. 6B, the protrusions 114 extend from the annular flange 110 so as to contact the crimping portion 206 of the valve cup 204. The interference fit created by the protrusions 114 contacting the crimping portion 206 secures the positioning of the valve cup 204 onto the bottle 100 such that the valve cup 204 will not shift or move before being crimped to the annular flange 110. Thus, the set valve cup 204 is more likely to be in the precise position necessary for a successful crimping operation.

The term "interference fit," as used herein, means a fastening between two parts, e.g., between the valve cup and the protrusions on the annular flange of the bottle, which is achieved by friction, after the parts are pushed together. In some embodiments, an interference fit according to the invention is achieved by having about 0.1 mm to about 0.2 mm of overlap between the protrusions 114 and the crimping portion 206 of the valve cup 204. For example, with a circular annular flange 110, the protrusions 114 extend from the annular flange 110 to points that define a diameter of the bottle 100 that is about 0.1 mm to about 0.2 mm greater than the diameter of the crimping portion 206 of the valve cop 204.

FIG. 7 depicts the valve cup 204 alter being crimped to the annular flange 110 of the bottle 100. After crimping, the crimping portion 206 of the valve cup 204 is folded around and under the annular flange 110. This crimping of the valve cup 204 to the annular flange 110 of the bottle 100 provides a secure attachment such that valve cup 204 will remain in place when the bottle 100 is filled with product. For example, when filled with an aerosol product as described above, the crimped valve cup 204 will, remain in place against the internal pressure of the bottle. It should be noted, however, that in alternative embodiments, the crimping portion 206 could, be less extended relative to the flange 110 than is shown in FIG. 7. That is, the crimping portion 206 could be shortened so as to crimp to the sides of annular flange 110, but not to extend around to the underside of the annular flange 110 when crimped.

As discussed above, the components of the valve structure 200, including the valve cup 204 with the crimping portion 206, can be formed from plastic or metallic materials. In some embodiments, the material used to form the valve cup 204 is selected based on the configuration and structure of the protrusions 114. For example, if the protrusions 114 are made from a thermoplastic material that is more malleable/flexible, or the protrusions 114 extend in the lower range of the distances described above, the crimping portion 206 of the valve cup 204 can be formed from a more rigid material, such as a rigid metallic material. As another example, if the protrusions 114 are made from a thermoplastic material that is less malleable/flexible, or the protrusions 114 extend in the upper range of the distances described above, the crimping portion 206 of the valve cup 204 can be made from malleable/flexible materials. With such examples, the interference fit can be formed between the protrusions 114 and the crimping portions 206, while still allowing for malleability/flexibility in the contacting structures, such that there is little danger of the bottle cracking as the contacting structures are brought together in the interference fit.

The valve cup 204 depicted in FIGS. 6A, 6B, and 7 is commonly referred to as being "externally crimped" inasmuch as the crimping portion 206 of the valve cup 204 extends over an outside portion (annular flange 110) of the bottle 100. In alternative embodiments, a bottle and valve cup according to the invention may be provided such that the valve cup is internally crimped to the bottle, i.e., the crimping portion of the valve crimps to the inside of the bottle. In such embodiments, protrusions provided on the bottle extend from a surface on the inside of the bottle to which the valve is crimped. In such embodiments, an interference fit between the protrusions and the internally-crimped valve cup is created in the same manner as the externally-crimped valve cup.

A manufacturing process for providing a system for dispensing an aerosol composition will now be described. In the inventive manufacturing process, a bottle, as described above, is initially provided. That is, a bottle is formed from a thermoplastic material using, for example, the injection molding process and the blow molding process described above. The molded thermoplastic bottle includes an open end and a closed end, and an annular flange with protrusions is provided adjacent to the open end of the bottle.

The bottle is positioned in the manufacturing line at a station wherein a valve cup is set to the open end of the bottle. As described above, the valve cup is sized and configured such that an interference fit is achieved between a crimping portion of the valve cup and the protrusions on the flange of the bottle. The bottle is then moved to a second location wherein the valve cup is crimped to the annular flange. For these operations, any form of setting and crimping devices may be used that are capable of positioning the valve cup to the bottle and capable of pressing the valve cup to the flange of the bottle in the crimping operation. Such devices are known in the art. Additionally, it is again noted that in alternative embodiments, structures other than a valve cup may be set and crimped to the bottle. In such embodiments, the same types of manufacturing processes and devices may be used.

Because of the interference fit between the crimping portion of the valve cup and the protrusions extending from the flange of the bottle, the valve cup cannot easily move from the set position, prior to the valve cup being crimped to the bottle. Thus, even when the valve cup must be precisely set on the bottle to ensure crimping the valve cup, the bottle with the set valve cup can still be moved to a location in the manufacturing line for the crimping operation. Moreover, because the protrusions are part of the bottle structure, the provision of the protrusions does not create any high stress areas in the bottle structure after the valve cup is crimped to the bottle.

The manufacturing process can also include steps of filling the bottle with the product. In specific embodiments, these steps include filling the bottle with an aerosol composition such that the bottle becomes pressurised. Along these lines, the manufacturing process can also include steps of providing components of the valve structure to the bottle in addition to the valve cup. Those skilled in the art will recognize the numerous techniques tor performing such steps. Moreover, those skilled in the art will recognize that such steps can be preformed in different orders in different processes.

As an example of yet another alternative process according to the invention, a structure may be positioned to the bottle at a location in a manufacturing process line, and the structure may be crimped to the bottle at the same location. That is, a mechanism may be provided that sets the structure on tire bottle at a location, and then a crimping mechanism may be brought to the location to crimp the structure to the bottle. In this case, the interference fit created by the protrusions on the bottle and the crimping portion of the structure prevents the structure from shifting that still might occur even though the bottle is in the same position during the setting and crimping operations.

Although this invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in ad respects to be illustrative and not restrictive, and the scope of the invention to be determined by any claims supportable by this application and the equivalents thereof, rather than by the foregoing description.

INDUSTRIAL APPLICABILITY

The invention described herein can be used to produce a wide variety of commercial products, including systems to dispense aerosol compositions such as air fresheners, carpet cleaners, insect repellants, deodorants, hair sprays, and cleaning preparations. As such, the inventive apparatuses, systems, and methods described herein are applicable to numerous industries.

We claim:

1. A bottle comprising:
   a main body with an open end and a closed end, wherein an axis of the bottle is defined between the open end and the closed end;
   a flange positioned (i) adjacent to the open end and (ii) adjacent to a portion of the main body, the flange extending further from the axis of the bottle than the adjacent portion of the main body extends from the axis of the bottle, wherein the flange is configured to contact a structure that is crimped to the flange in such a manner so as to close the open end of the bottle, with the flange retaining the crimped structure to the bottle; and
   a plurality of protrusions extending from a circumferential surface of the flange in a direction at least substantially perpendicular to the axis of the bottle, wherein the protrusions are spaced from each other such that a majority of the circumferential surface of the flange does not include protrusions extending therefrom, and wherein the main body, the flange, and the protrusions are formed from a thermoplastic material.

2. A bottle according to claim 1, wherein the protrusions extend from about 0.02 mm to about 2 mm outward from the flange.

3. A bottle according to claim 2, wherein the protrusions extend about 0.1 mm outwards from the flange.

4. A bottle according to claim 1, wherein the protrusions are positioned symmetrically about the flange.

5. A bottle according to claim 1, wherein the bottle is configured to be pressure resistant so as to contain an aerosol product under pressure.

6. A bottle according to claim 1, wherein the flange has an annular shape.

7. A bottle according to claim 1, wherein the bottle is manufactured using at least one of a blow molding process and an injection molding process.

8. A method of providing a system for dispensing an aerosol composition, the method comprising:
   providing a bottle made from a thermoplastic material, the bottle having an open end and a closed end, with an axis of the bottle being defined between the open end and the closed end;
   setting a structure adjacent to a flange at one end of the bottle, with an interference fit being formed between the structure and protrusions extending from a circumferential surface of the flange, with the structure substantially closing the open end of the bottle, with the protrusions extending from the flange in a direction at least substantially perpendicular to the axis of the bottle, and with the protrusions being spaced from each other such that a majority of the circumferential surface of the flange does not include protrusions extending therefrom;
   crimping the structure to the flange of the bottle; and
   providing an aerosol composition in the bottle.

9. The method according to claim 8, wherein the structure is a valve cup.

10. The method according to claim 8, wherein the protrusions extend from about 0.02 mm to about 2 mm outward from the flange.

11. The method according to claim 9, wherein the protrusions are symmetrically positioned about the flange.

12. The method according to claim 8, wherein the bottle is formed using at least one of a blow molding process and an injection molding process.

13. A bottle comprising:
   a main body with an open end and a closed end, wherein an axis of the bottle is defined between the open end and the closed end;
   a flange positioned (i) adjacent to the open end and (ii) adjacent to a portion of the main body, the flange extending further from the axis of the bottle than the adjacent portion of the main body extends from the axis of the bottle, wherein the flange is configured to contact a structure that is crimped to the flange in such a manner so as to close the open end of the bottle, with the flange retaining the crimped structure to the bottle; and
   a plurality of protrusions extending from a circumferential surface of the flange in a direction at least substantially perpendicular to the axis of the bottle, the protrusions being spaced about the circumferential surface of the flange such that a total length that the protrusions extend about the circumferential surface is less than a total length of the circumferential surface between the protrusions,
   wherein the main body, the flange, and the protrusions are formed from a thermoplastic material.

14. A bottle according to claim 13, wherein the protrusions extend from about 0.02 mm to about 2 mm outward from the flange.

15. A bottle according to claim 14, wherein the protrusions extend about 0.1 mm outwards from the flange.

16. A bottle according to claim 13, wherein the protrusions are positioned symmetrically about the flange.

17. A bottle according to claim 13, wherein the bottle is configured to be pressure resistant so as to contain an aerosol product under pressure.

18. A bottle according to claim 13, wherein the flange has an annular shape.

19. A bottle according to claim 13, wherein the bottle is manufactured using at least one of a blow molding process and an injection molding process.

* * * * *